Aug. 30, 1966 P. R. JARDINE ET AL 3,270,101
METHOD OF USING STATIC CHARGE TO DECORATE
MOLDED THERMOPLASTIC ARTICLES
Filed April 1, 1963 2 Sheets-Sheet 1

INVENTORS
PHILIP R. JARDINE
ROBERT N. PIM
WINTHROP S. LAWRENCE
WALTER L. HOCHNER
BY Connolly and Hutz
ATTORNEYS

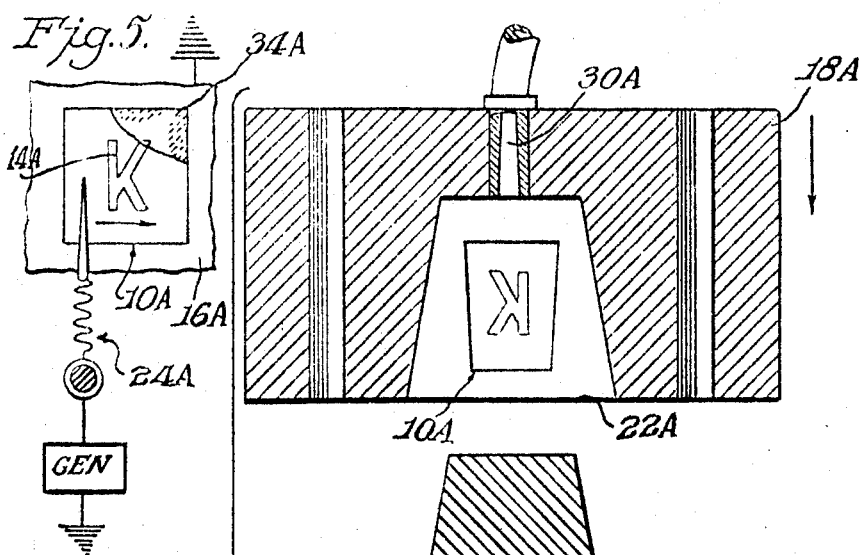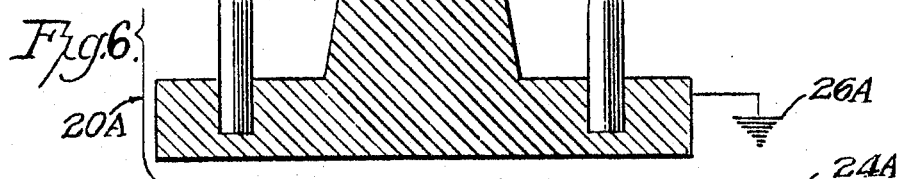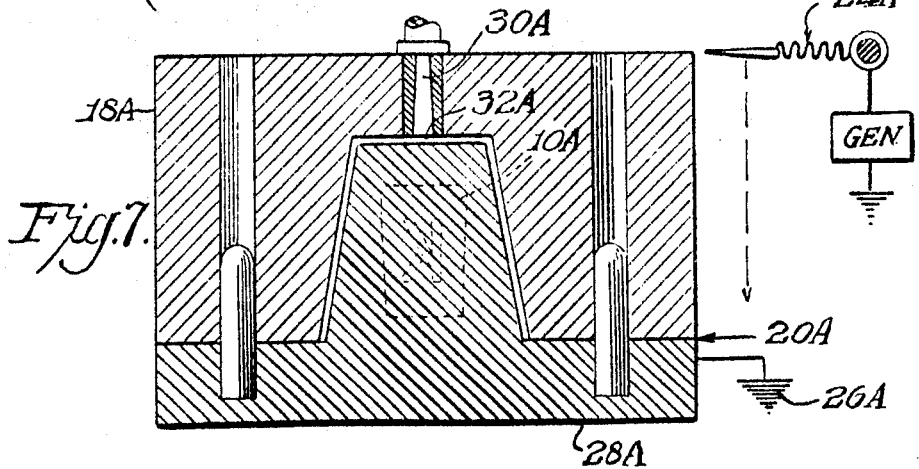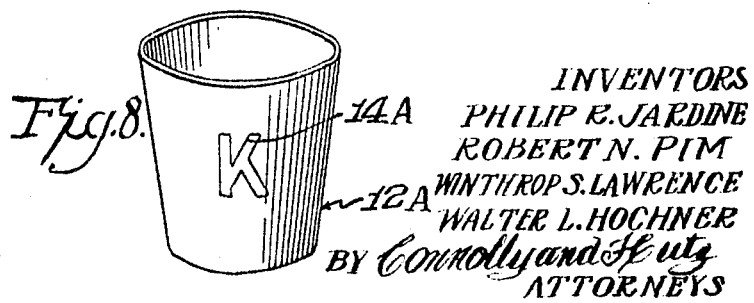

3,270,101
METHOD OF USING STATIC CHARGE TO DECORATE MOLDED THERMOPLASTIC ARTICLES

Philip R. Jardine, Wilmington, Del., Robert N. Pim, Media, and Winthrop S. Lawrence, Chester, Pa., and Walter L. Hochner, Wilmington, Del., assignors to Kaumagraph Company, Wilmington, Del., a corporation of Delaware
Filed Apr. 1, 1963, Ser. No. 269,819
6 Claims. (Cl. 264—22)

This application is a continuation-in-part of prior application Serial No. 164,881, now abandoned, filed January 8, 1962, and Serial No. 166,496, now abandoned, filed January 16, 1962.

This invention relates to the decoration of thermoplastic injection-molded articles; and it more particularly relates to a novel method for performing it, to a novel strip of printed film accomplishing it and to a novel decorated article formed thereby.

In general, conventional procedures, as for example decalcomania, laminating and direct printing, have not proven satisfactory for providing molded thermoplastic articles with desired decorative or descriptive matter. Decorative or other matter applied by decalcomania and direct printing techniques is generally exposed and thus is easily damaged or abraded, while with laminating procedures the usual problems of air entrapment between layers, article distortion, and separation of layers are often encountered. The deficiencies of these known procedures are, of course, more pronounced when complicated molded articles are being produced, and especially articles which are molded of thermoplastic materials which have an inherent resistance to dyes or inks and lack the capacity to adhere to other materials, as for example in the case of polyalkylenes, such as polyethylene and polypropylene.

In other words thermoplastic materials such as polypropylene, polyethylene, and polystyrene are quite economically fabricated by injection-molding into many useful articles, such as small containers and other plastic parts. However, materials of this sort are extremely difficult to decorate by conventional methods such as painting or hot stamping.

Accordingly, a primary object of this invention is to provide a new or generally improved and more satisfactory method for providing injection-molded plastic articles with decorative and/or descriptive printed matter.

A further object is to provide such a method which can be accomplished simultaneously with molding.

Still another object is the provision of a film overlay decorating technique for injection-molded plastic articles.

A further object is to provide a method wherein printed decorative and/or descriptive material may be integrally incorporated into an injection-molded article during the molding thereof.

In accordance with this invention a strip of thin flexible thermoplastic film having a decoration imprinted upon it is inserted into an injection mold before the hot molding compound is injected into it. The composition of this film is compatible with the molding compound to permit it to become intimately interfacially fused within it when it is injection molded. Although any coated or inked areas may not fuse, they will be bonded adequately in themselves and by virtue of the fusion of bare areas. Ink printed films therefore require substantial clean areas to provide adequate fusion when printed face is incorporated inside the wall of the molded article.

Such a thin and flexible decorated film, ranging in thickness from approximately 3 to approximately 6 mils, may be transparent and securely maintained in intimate enough contact with the wall of the mold while the molding compound is injected to dependably maintain it in the desired position relative to the molded article and in effective heat exchange relationship with the wall. This intimate contact can be maintained by electrostatically charging the film and maintaining it so charged while the molding compound is injected. For reasons which are not completely understood, this novel decorated film and unique method of incorporating it in a molded article uniquely and dependably interfacially fuse a flimsy film to an injected molded article in the presence of severe injection-molding conditions without destroying or even distorting it thereby remarkably effectively and attractively applying a physically and visually inseparable decoration upon injected-molded articles.

Novel features and advantages of the present invention will become apparent to one skilled in the art from a reading of the following description in conjunction with the accompanying drawings wherein similar reference characters refer to similar parts and in which:

FIG. 5 is a plan view of a novel strip of printed film being electrostatically charged;

FIG. 6 is a cross-sectional view in elevation of the strip of film shown in FIG. 1 placed within an opened injection mold;

FIG. 7 is a cross-sectional view in elevation of the injection mold shown in FIG. 2 in a closed condition; and FIG. 8 is a perspective view of an injection-molded thermoplastic article decorated by this invention.

Figure 1:
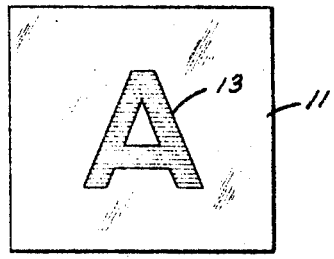
FIG. 1 is a plan view of a printed film overlay employed in the method of the present invention.

Generally, in accordance with the method of the present invention a thermoplastic polymeric film having decorative and/or descriptive subject matter printed thereon is positioned within a desirably shaped mold and supported against one wall thereof, afterwhich molten thermoplastic material is injected into and solidified within the mold. During the molding operation, the surfaces of the printed film or overlay which are exposed to the molten plastic material are fused and in effect lose their identity by blending with the injected plastic material. In the finished molded article the film overlay is integrally bonded within a shaped plastic body, with generally no juncture being visible between the film and the surrounding portions of plastic material.

The thermoplastic polymeric material used in forming the film overlay is preferably the same as that which is to be injected into the mold to thereby assure proper bonding and to avoid the introduction of differential stresses during the molding operation and subsequent use of the finished article. The film employed may be formed by known procedures, as for example, by chill roll casting techniques, and may be printed by conventional methods using available heat-resistant inks. When employing a polyalkylene film, the surface to be printed is, of course, modified as for example by chemical treatments, oxidation, subatomic bombardment, flame treatment, and the like to render the same more receptive to the inks employed. Except for the slight orientation of the polymer molecules which may be affected during film production, the film employed in the present method is essentially in an unoriented condition.

The thickness of the film employed as the overlay is of critical importance and for satisfactory practice of the present invention should range from about 3 to 11 mils, and more desirably from about 4 to 6 mils, in thickness. Films which are too thin; that is, less than 3 mils in thickness, undergo excessive and often complete fusion in the presence of the molten plastic material injected during the molding operation. Under this condition, the printed subject matter is distorted or "runs," and is thus unattractive and/or illegible. At the other extreme, when employing film overlays having a thickness greater than about 11 mils, heat from the injected plastic material is not distributed uniformly and rapidly throughout the film. As a result, the printed matter is often smeared and differential stresses are created during the molding operation, as evidenced by poor adhesion of the overlay and/or distortions in the finished article.

Support of the film overlay within the mold may be achieved by any suitable and known means. To avoid complicated molding techniques, the film overlay is preferably supported against one wall of the mold by a static charge, with its printed surface being exposed. With films made from polyethylene or polypropylene, for example, a static charge may be induced along the unprinted film surface simply by rubbing the same with a woolen cloth.

From the standpoint of simplicity and ease of description the method of the present invention is hereafter described as employed in the manufacture of a serving tray having a main body and printed film overlay formed of isotactic polypropylene.

With reference to the accompanying drawings, FIG. 1 illustrates an unoriented and transparent polypropylene film 11, having a decorative design 13 printed on one surface thereof. The film 11 has a thickness within the range of from 3 to 11 mils and, as heretofore mentioned, would be pretreated to render at least one of its surfaces receptive to conventional heat resistant inks applied, for example, by known silk screening procedures.

Figure 2:
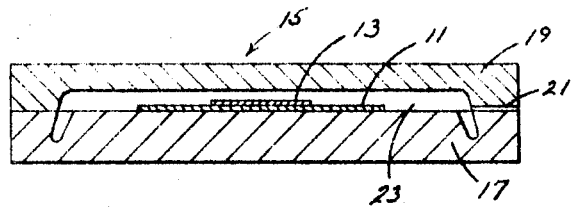
FIG. 2 is a vertical cross section taken transversely through a conventional mold with the film overlay positioned therein.
Figure 3:
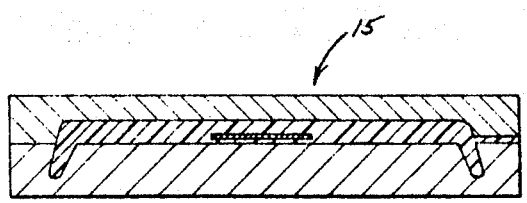
FIG. 3 is a view of the mold shown in FIG. 2 after plastic material has been injected therein.

The printed film 11 is positioned within a conventional mold 15 formed of mold blocks 17 and 19 which are shaped together provide a sprue opening 21 and a cavity 23 corresponding to the configuration desired in the finished article, as for example a serving tray. The film 11 is held snugly against the shaped surface of the mold block 17 by staticizing either the film or mold block, preferably with the printed surface of the film being exposed, as shown in FIG. 2. Molten polypropylene is then injected under pressure through the sprue opening 21 and into the mold cavity 23. The exposed surface portions of the film 11 are fused slightly by the heat of the injected molten polypropylene and blend therewith so that the identity of the overlay as a separate film no longer exists. The heat of the injected molten polypropylene has no softening effect on the printed portions of the film, due apparently to the insulative properties of the heat resistant inks which are employed.

Figure 4:
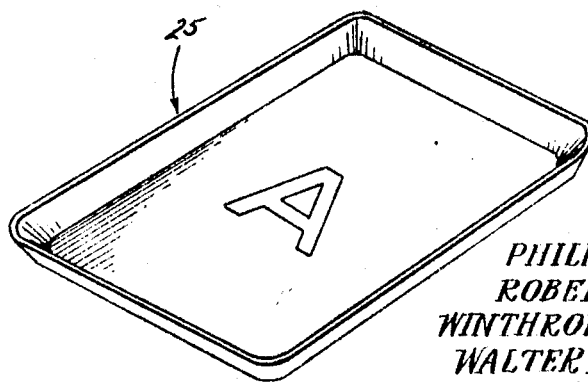
FIG. 4 is a perspective view of a molded article formed by the method of the present invention.

After a sufficient period has elapsed to insure that at least the surface portions of the injected polypropylene have solidified, the mold blocks are opened. With that portion of the injected polypropylene which had solidified in the sprue opening 21, being broken away, the finished tray 25 appears as illustrated in FIG. 4, wherein the printed portion of the film overlay is encased within a body of polypropylene. As a result of the slight surface fusion effected along the exposed portions of the printed film 13 during the molding operation, and the blending of these fused film portions with the injected polypropylene, the finished tray 25 exhibits no marks or lines which would suggest that a separate film overlay had been employed in the molding operation.

While the method of the present invention has been described as employed in the manufacture of polypropylene articles, it will be understood that other thermoplastic polymeric materials, as for example polyethylene, may be used providing the injected plastic material and the material forming the film overlay have similar chemical and thermal characteristics. Further, in positioning the film overlay within the mold its printed face may be placed against or away from the surface of the mold block on which the overlay rests. As heretofore described, the latter position is preferred since the printed matter is protected from wear in the finished article by the overlay film. If desired, opposite surfaces of the film overlay may be provided with printing. Conventional mold release agents; that is, agents which permit easier separation of the finished article from the mold, render the static attraction between the film overlay and mold block surface ineffective and should therefore be avoided. Additionally, to facilitate greater adhesion between the film overlay and the mold surface before the molten polymeric material is injected therein, the mold is maintained in a relatively cool condition; that is, at room temperature or lower.

The following examples are provided to more fully illustrate the method of the present invention;

Example I

An unoriented polypropylene film having a thickness of 4 mils was subjected to Corona discharge, after which its treated surface was provided with a decorative rose pattern by a conventional silk screening procedure and with the use of known heat resistant inks. The unprinted surface of this film overlay was then rubbed with a woolen cloth to induce a static charge therein. The film overlay was then placed within a mold having a cavity shaped in the form of a serving tray and was held snugly against one wall of the mold cavity with its printed surface exposed solely by the induced static charge.

With the mold maintained at a temperature of 80° F., molten polypropylene was injected into the mold cavity under a ram pressure of 13,000 pounds per square inch (p.s.i.) from the cylinder of a conventional plastic injecting apparatus heated to a temperature of 575° F. Injection of the molten polypropylene was completed in 15 seconds and the entire molding cycle required a total of 45 seconds.

The serving tray molded under the above conditions was similar to that illustrated in FIG. 4 of the drawing and had a wall thickness of 0.100 inch. The printed decorative rose pattern was completely encased within polypropylene and retained its original colors and sharp detail.

Example II

With the procedure described in Example I, a series of polypropylene films, each of 2 mil thickness, were printed with a rose pattern and were then positioned within individual molds. Employing equipment as described in Example I, molten polypropylene was injected into the mold cavities under ram pressures ranging from 13,000 to 16,000 p.s.i. from an injection cylinder heated to temperatures ranging from 500° to 575° F. The injection stages each required 15 seconds for completion during which time the molds were maintained at temperatures ranging from 60° to 80° F.

The printed rose pattern on serving trays produced under the above conditions was blurred and in some samples appeared as a mixture of colors as a result of excessive fusion and flow of the film overlay.

*Example III*

Serving trays were molded employing the equipment, conditions and materials as set forth in Example II, with the exception that the printed film overlays had a thickness of 12 mils. The resulting molded trays were found unacceptable due to smeared patterns and distortions in the tray walls.

It is to be understood that changes and variations may be made without departing from the spirit and scope of the invention defined in the appended claims.

In FIG. 5 is shown a strip 10A of film for decorating injection-molded thermoplastic articles. Strip 10A is therein shown disposed upon a grounded plate 16A for electrostatic charging in a manner later described in detail. The composition of film 10A is compatible for facilitating its substantially complete interfacial fusion with the composition of the ultimately molded thermoplastic article 12A shown in FIG. 8. When article 12A is for example made of polypropylene, film 10A is also preferably made of polypropylene; and for example when article 12 is made of polystyrene, film 10A is also preferably made of polystyrene. This permits the film to interfacially fuse intimately within the surface of the molded article and be substantially visually inseparable from it. In addition to this compatibility of composition, the film should range from approximately three to approximately six mils in thickness; and the physical and adhesive properties of the ink of decoration 14A upon it which is for example the letter "K," must not be subject to being deleteriously affected by injection-molding conditions. A particularly effective form of such a film, which becomes remarkably intimately fused interfacially within a molded article 10A in a manner in which it is practically completely physically and visually inseparable from it, is approximately four mils in thickness; and such a film can be made practically completely transparent. Such a film is remarkably completely interfacially bonded in situ within the wall of the molded article without destruction or distortion because it is flexible enough to be maintained in close contact with the wall of an injection mold when it is electrostatically charged. The thinness of the film therefore, unexpectedly helps protect it in an injection mold rather than making it highly subject to destruction under such conditions as would have been previously expected prior to this invention.

In FIG. 5, film 10A is shown inserted within the movable half 18A of a two-piece injection mold 20A. Film 10A is intimately contacted to the wall 22A of mold portion 18A, and it is securely maintained in contact with wall 22A, for example by electrostatically charging it from a static electricity generator 24A. Generator 24A is, for example, of the type described in U.S. Patent No. 2,163,294 which can be operated by A.C. or D.C. power. It can be applied to film 10A both before and after insertion into mold 20A, as respectively shown in FIGS. 5 and 7. It is essential that plate 16A and mold 20A be grounded, as schematically illustrated by ground connections 26A, to avoid shocking operators. Sufficient static electricity is thereby imparted to film 10A to maintain it securely and intimately contacted with wall 22A of mold portion 18A throughout the entire molding operation. Furthermore, this form of attachment leaves no troublesome residues upon either foil or mold wall after molding is completed; and it also permits detachment and removal of the molded article with facility. The secure retention of the film to wall 22A also maintains it in highly effective heat exchange relationship with it, which is believed to be part of the reason why the film is remarkably resistant to deterioration or distortion by the hot injection-molding composition.

FIG. 7 indicates the relative positions of the parts of injection mold 22A when movable half 18A is moved into engagement with fixed half 28A of mold 20A. The mobility of these parts can be interchanged with portion 28A made movable, and part 18A made fixed as desired for molding convenience. The hot injection-molding compound is introduced through sprue 30A, and it enters the mold cavity through gate 32A. When decoration 14A is disposed away from the mold wall, gate 32A is preferably remote from the disposition of foil 10A. Although the contrary might be expected, positioning gate 32A remote from foil 10A prevents the rapid inrush of the injection-molding composition under high pressures from destroying foil 10A or its decoration. However, if necessary to gate directly behind the film, the strip can be imprinted upon the side away from the gate to prevent it from being washed away. The exposed ink surface can be protected by coating 34A, shown in FIG. 1 to make it functionally durable. This coating may be in the form of a polyurethane or epoxy resin.

An injection-molding composition such as polypropylene may be accordingly injected at temperatures ranging from 300 to 500° F. and pressures ranging from 15,000 to 30,000 p.s.i. into a mold containing an electrostatically-charged strip of nonoriented polypropylene film. Although the film is quite thin, it is not distorted or destroyed by the hot pressurized thermoplastic compound which is pumped into the mold. The freedom of the thin strip from distortion or destruction in the mold is quite surprising in view of the fact that such thin polypropylene film distorts at 180° F. and melts at 300° F.

A four mil polypropylene film of the nonoriented type, printed for example by the offset process with a decoration 14A such as the letter "K" secured in contact with the mold wall before introduction of the molding compound, causes this letter "K" to be intimately and permanently imprinted upon the ultimately molded article 12A shown in FIG. 8. Since a film of this type can be made practically completely transparent, it is visually as well as physically inseparable from the wall of the molded article 12A leaving only the printed decoration 14A visible upon it when it is interfacially fused within its wall.

Although the inked areas are not actually fused, the fusion of clean areas and the more superficial bonding of these inked areas cooperated to provide dependable attachment of such strips even when the inked face is molded inside the wall of the molded article. However, it is helpful in such cases to maintain extensive peripheral areas and interspersed areas bare of ink to provide secure attachment overall.

This mode of decoration is therefore quite different from the incorporation of thicker inserts of dissimilar plastic materials within molded articles, which are only superficially mechanically and adhesively bonded to the molded articles. In addition to their lack of the intimate interfacial fusion of this invention, such dissimilar inserts cannot be nearly as transparent as the thin inserts of this invention. This invention is therefore uniquely effective in making it appear that a decoration is imprinted upon the article itself rather than upon an insert placed within the injection mold. Furthermore, it permits advantageous halftone printing techniques to be used for decorating.

What is claimed is:

1. A method of decorating a resinous thermoplastic injection molded article comprising adhering a thin, flexible thermoplastic film at least one side of which carries a decoration to a wall of an injection mold by electrostatic attraction, such film having a thickness between 3 and 11 mils and being of a composition compatible with a resinous thermoplastic mass injected into the mold and injecting said resinous thermoplastic mass into the mold whereby the thin flexible thermoplastic film is maintained in intimate contact with the wall of the mold, in the desired position and in an effective heat exchange relationship with the wall predominately by electrostatic attraction and is intimately and interfacially fused with the thermosplastic mass without distortion of the decoration.

2. The method of claim 1 wherein the film has a thickness from 4 to 6 mils.

3. The method of claim 1 wherein one side of the film carries the decoration and said side is disposed remote from the wall of the mold.

4. The method of claim 1 wherein peripheral areas of the decorated side of the film are free from decoration.

5. The method of claim 1 wherein the electrostatic attraction is induced by staticizing the film.

6. The method of claim 1 wherein the electrostatic attraction is induced by staticizing the wall of the mold.

References Cited by the Examiner

UNITED STATES PATENTS

| | | |
|---|---|---|
| 2,330,718 | 9/1943 | Kallman. |
| 2,622,991 | 12/1952 | Sturm _____ 161—5 XR |
| 3,057,018 | 10/1962 | Lawrence et al. ___ 156—245 X |
| 3,068,528 | 12/1962 | Owens. |
| 3,091,562 | 5/1963 | Berlepsch et al. _____ 156—245 |
| 3,108,850 | 10/1963 | Brandt _____ 264—275 |
| 3,122,598 | 2/1964 | Berger _____ 264—132 |

OTHER REFERENCES

New Built-In Properties of Polypropylene, Resin News, June 1961 (page 4), TP 977 R45.

ALEXANDER WYMAN, *Primary Examiner.*

JACOB STEINBERG, *Examiner.*